United States Patent
Meo et al.

(10) Patent No.: US 10,126,503 B2
(45) Date of Patent: Nov. 13, 2018

(54) OPTICAL-FIBER FUSION-SPLICING DEVICE

(71) Applicant: SEI Optifrontier Co., Ltd., Yokohama-shi, Kanagawa (JP)

(72) Inventors: Ryosuke Meo, Yokohama (JP); Kazufumi Joko, Yokohama (JP); Makoto Miyamori, Yokohama (JP); Toshihiko Homma, Yokohama (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 156 days.

(21) Appl. No.: 15/112,481

(22) PCT Filed: Nov. 26, 2014

(86) PCT No.: PCT/JP2014/081227
§ 371 (c)(1),
(2) Date: Jul. 19, 2016

(87) PCT Pub. No.: WO2015/114925
PCT Pub. Date: Aug. 6, 2015

(65) Prior Publication Data
US 2016/0334578 A1  Nov. 17, 2016

(30) Foreign Application Priority Data
Jan. 28, 2014 (JP) .................................. 2014/013809

(51) Int. Cl.
*G02B 6/255* (2006.01)
(52) U.S. Cl.
CPC ........... *G02B 6/2553* (2013.01); *G02B 6/255* (2013.01); *G02B 6/2551* (2013.01)

(58) Field of Classification Search
CPC ..................................................... G02B 6/255
See application file for complete search history.

(56) References Cited

U.S. PATENT DOCUMENTS 4,274,707 A * 6/1981 Pacey .................. G02B 6/2551
219/121.58
4,460,820 A * 7/1984 Matsumoto ............. B29C 61/00
174/DIG. 8

(Continued)

FOREIGN PATENT DOCUMENTS

JP  H02-73602 U  6/1990
JP  H04-24705 U  2/1992

(Continued)

*Primary Examiner* — Cynthia Szewczyk
(74) *Attorney, Agent, or Firm* — Drinker Biddle & Reath LLP

(57) ABSTRACT

This optical-fiber fusion-splicing device includes: a first heating device (12); a second heating device (13); and a CPU (14) which controls the first heating device (12) and the second heating device (13), wherein the CPU (14) stops heating of the second heating device (13) if heating of the first heating device (12) is started during heating in the second heating device (13), and resumes the heating of the second heating device (13) if the heating of the first heating device (12) is ended, and sets a heating condition after resumption of heating in the second heating device (13), based on at least an interruption time of heating or a change in temperature during heating interruption in the second heating device (13).

4 Claims, 3 Drawing Sheets

(56) References Cited

U.S. PATENT DOCUMENTS

| | | | |
|---|---|---|---|
| 6,437,299 B1 | 8/2002 | Watanabe et al. | |
| 2006/0280417 A1* | 12/2006 | Sato | G02B 6/2551 |
| | | | 385/134 |
| 2015/0168649 A1* | 6/2015 | Fukuda | G02B 6/2558 |
| | | | 219/490 |

FOREIGN PATENT DOCUMENTS

| | | |
|---|---|---|
| JP | H05-164933 A | 6/1993 |
| JP | 2001-013355 A | 1/2001 |
| JP | 3293594 B2 | 6/2002 |
| WO | WO-2014/021185 A1 | 2/2014 |

* cited by examiner

# OPTICAL-FIBER FUSION-SPLICING DEVICE

TECHNICAL FIELD

The present invention relates to an optical-fiber fusion-splicing device which fuses and splices optical fibers with end faces brought into contact with each other and reinforces the fusion-spliced portion by a heat-shrinkable resin.

BACKGROUND ART

In the related art, bringing the end faces of optical fibers into contact with each other and fusing the abutting parts by an electric discharge in a fusion device, and thereafter, performing reinforcement by heat-shrinking a heat-shrinkable resin covering a fusion-spliced portion in a reinforcement device are performed (refer to PTLs 1 to 4).

CITATION LIST

Patent Literature

[PTL 1] JP-A-5-164933
[PTL 2] JP-UM-A-4-24705
[PTL 3] Japanese Patent No. 3293594
[PTL 4] JP-UM-A-2-73602

SUMMARY OF INVENTION

Technical Problem

In a fusion-splicing device in which available power-supply capacity or the upper limit of power is determined, it is difficult to simultaneously carry out an electric discharge for discharge-fusion and reinforcement for heating and shrink a heat-shrinkable resin within the range of the set power-supply capacity or power. In such a fusion-splicing device, for example, as described in PTL 1, in a case where discharge-fusion is performed during a reinforcing operation of heating a heat-shrinkable resin at a predetermined time set in advance, heating by a reinforcement device is interrupted during an electric discharge. Further, a heating time of the heat-shrinkable resin is set to be substantially the sum of a period after temperature rising and before interruption and a period after interruption and before cooling, and the total heating time is set so as to become the predetermined time set in advance.

In this manner, in a case where discharge-fusion is performed during the reinforcing operation, a reinforcing operation time becomes longer by an amount corresponding to the heating interruption time than in a case where the discharge-fusion is not performed during the reinforcing operation. Further, if heating is performed such that the sum of the heating times except for the heating interruption time simply becomes a predetermined time, a heating amount of the heat-shrinkable resin is increased more than necessary due to the influence of residual heat during the heating interruption time, and thus the reliability of a reinforcement part is lowered.

The present invention has an object to provide an optical-fiber fusion-splicing device in which it is possible to secure high reliability of a reinforcement part while preventing a reinforcing operation time from becoming unnecessarily long, even if a reinforcing operation is interrupted.

Solution to Problem

An optical-fiber fusion-splicing device according to the invention, comprises: a first heating device in which a fusion-splicing operation of heating and fusing abutting parts of at least a pair of optical fibers with end faces brought into contact with each other is performed;
a second heating device in which a reinforcing operation of heating and shrinking a heat-shrinkable resin which covers a fusion-spliced portion is performed; and
a control unit which controls the first heating device and the second heating device,
wherein the control unit stops heating of the second heating device if heating of the first heating device is started during heating in the second heating device, and resumes the heating of the second heating device if the heating of the first heating device is ended, and sets a heating condition after resumption of heating in the second heating device, based on at least an interruption time of heating in the second heating device.

An optical-fiber fusion-splicing device according to the invention, comprises:
a first heating device in which a fusion-splicing operation of heating and fusing abutting parts of at least a pair of optical fibers with end faces brought into contact with each other is performed;
a second heating device in which a reinforcing operation of heating and shrinking a heat-shrinkable resin which covers a fusion-spliced portion is performed; and
a control unit which controls the first heating device and the second heating device,
wherein the control unit stops heating of the second heating device if heating of the first heating device is started during heating in the second heating device, and resumes the heating of the second heating device if the heating of the first heating device is ended, and sets a heating condition after resumption of heating in the second heating device, based on at least a change in temperature during heating interruption in the second heating device.

Advantageous Effects of Invention

According to the invention, it is possible to provide an optical-fiber fusion-splicing device in which it is possible to secure high reliability of a reinforcement part while preventing a reinforcing operation time from becoming unnecessarily long, even if a reinforcing operation is interrupted.

DESCRIPTION OF EMBODIMENTS

Figure 1:
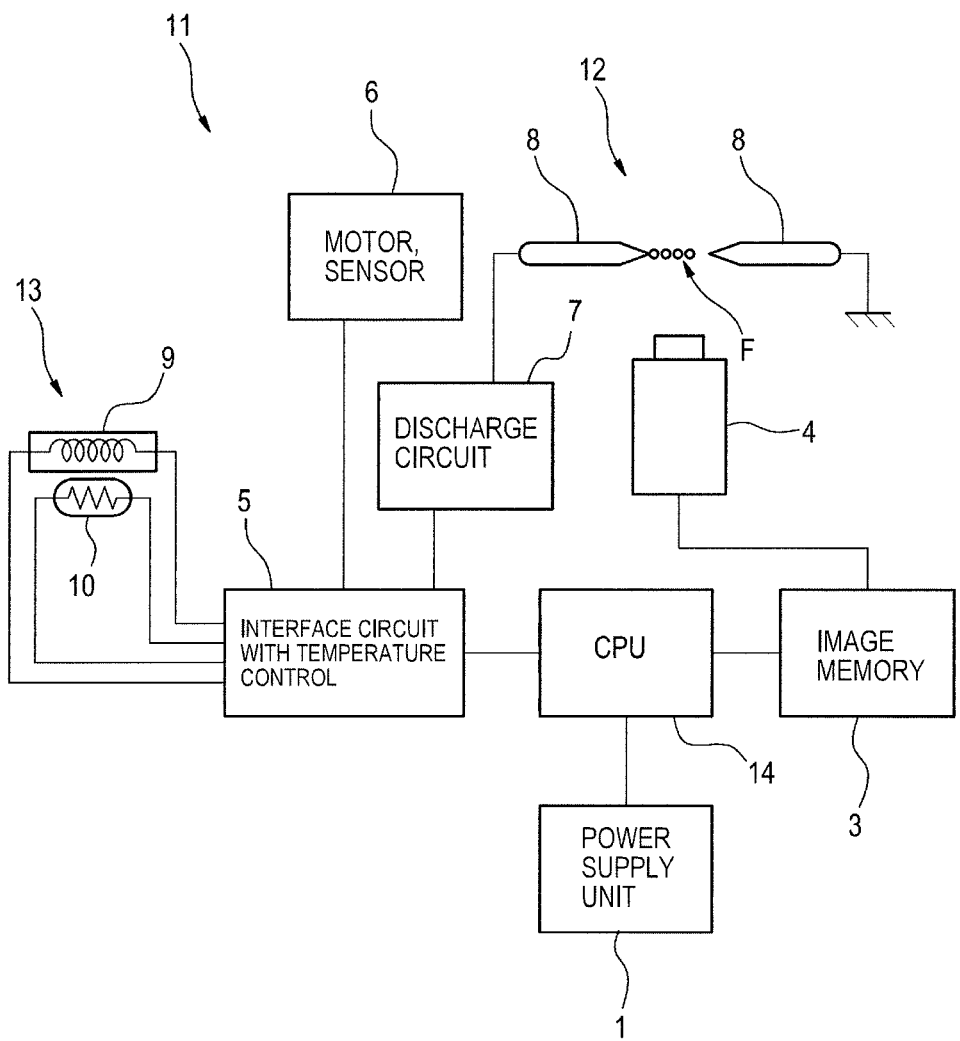
FIG. 1 is a schematic block diagram showing the configuration of an optical-fiber fusion-splicing device according to an embodiment of the present invention.

<Summary of Embodiment of the Present Invention>

First, a summary of an embodiment of the present invention will be described.

(1) An optical-fiber fusion-splicing device according to the invention, comprises:
a first heating device in which a fusion-splicing operation of heating and fusing abutting parts of at least a pair of optical fibers with end faces brought into contact with each other is performed;

a second heating device in which a reinforcing operation of heating and shrinking a heat-shrinkable resin which covers a fusion-spliced portion is performed; and a control unit which controls the first heating device and the second heating device, wherein the control unit stops heating of the second heating device if heating of the first heating device is started during heating in the second heating device, and resumes the heating of the second heating device if the heating of the first heating device is ended, and sets a heating condition after resumption of heating in the second heating device, based on at least an interruption time of heating in the second heating device.

According to the configuration of (1), the heating condition after the heating resumption in the second heating device can be set in consideration of residual heat during the heating interruption, based on an interruption time of heating in the second heating device which has been stopped due to heating of the first heating device. In this way, for example, a heating time after the heating resumption is set to be a heating amount necessary for the shrinkage of the heat-shrinkable resin, whereby it is possible to prevent a reinforcing operation time from becoming unnecessarily long. Further, it is also possible to eliminate excessive heating of the heat-shrinkable resin, and thus it is possible to enhance the reliability of a reinforcement portion. Further, for example, a heating temperature after the heating resumption can be adjusted, thereby being set to be a heating amount necessary for the shrinkage of the heat-shrinkable resin. Also in this case, it is possible to prevent the reinforcing operation time from becoming unnecessarily long, and it is also possible to enhance the reliability of the reinforcement portion by eliminating excessive heating of the heat-shrinkable resin.

(2) An optical-fiber fusion-splicing device according to the invention, comprises:

a first heating device in which a fusion-splicing operation of heating and fusing abutting parts of at least a pair of optical fibers with end faces brought into contact with each other is performed;

a second heating device in which a reinforcing operation of heating and shrinking a heat-shrinkable resin which covers a fusion-spliced portion is performed; and a control unit which controls the first heating device and the second heating device, wherein the control unit stops heating of the second heating device if heating of the first heating device is started during heating in the second heating device, and resumes the heating of the second heating device if the heating of the first heating device is ended, and sets a heating condition after resumption of heating in the second heating device, based on at least a change in temperature during heating interruption in the second heating device.

According to the configuration of (2), the heating condition after the heating resumption in the second heating device can be set in consideration of residual heat during the heating interruption, based on a change in temperature during the heating interruption in the second heating device which has been stopped due to heating of the first heating device. In this way, for example, a heating time after the heating resumption is set to be a heating amount necessary for the shrinkage of the heat-shrinkable resin, whereby it is possible to prevent the reinforcing operation time from becoming unnecessarily long. Further, it is also possible to eliminate excessive heating of the heat-shrinkable resin, and thus it is possible to enhance the reliability of the reinforcement portion. Further, for example, a heating temperature after the heating resumption can be adjusted, thereby being set to be a heating amount necessary for the shrinkage of the heat-shrinkable resin. Also in this case, it is possible to prevent the reinforcing operation time from becoming unnecessarily long, and it is also possible to enhance the reliability of the reinforcement portion by eliminating excessive heating of the heat-shrinkable resin.

<Details of Embodiment of the Present Invention>

Hereinafter, an example of an embodiment of an optical-fiber fusion-splicing device according to the present invention will be described with reference to the drawings. In addition, the present invention is not limited to the exemplification and it is intended to include all modifications within the meaning and the scope equivalent to those in the appended claims, as indicated by the claims.

FIG. 1 is a schematic block diagram showing the configuration of an optical-fiber fusion-splicing device 11 according to an embodiment of the present invention.

As shown in FIG. 1, the fusion-splicing device 11 according to this example is provided with a first heating device 12, a second heating device 13, and a CPU (an example of a control unit) 14. Further, the fusion-splicing device 11 is provided with a power supply unit 1, an image memory 3, a camera 4, an interface circuit with temperature control 5, a motor and sensor 6, and a discharge circuit 7.

The first heating device 12 has a discharge electrode 8, and in the first heating device 12, a fusion-splicing operation of heating and fusing abutting parts of optical fibers F with end faces brought into contact with each other, by arc discharge, is performed.

The second heating device 13 has a heater 9 and a thermistor 10, and in the second heating device 13, a reinforcing operation of heating and shrinking a heat-shrinkable resin which covers a fusion-spliced portion of the optical fiber F is performed.

The fusion-splicing operation of the first heating device 12 and the reinforcing operation of the second heating device 13 are controlled by the CPU 14 and the interface circuit with temperature control 5.

The power supply unit 1 supplies electric power to the heater 9 through the interface circuit with temperature control 5, and supplies electric power to a pair of discharge electrodes 8 of the first heating device 12 through the interface circuit with temperature control 5 and the discharge circuit 7, under the control of the CPU 14. The pair of discharge electrodes 8 is disposed with a distance therebetween, and the optical fibers F to be fusion-spliced are disposed in the vicinity of a line connecting the centers of the discharge electrodes 8. In the first heating device 12, the optical fibers F abutted with each other are fusion-spliced to each other by being heated by arc discharge which is generated between the discharge electrodes 8.

The camera 4 is disposed below the optical fibers F. The image memory 3 is connected to the camera 4, and image data of the magnified optical fibers F is stored in the image memory 3. As the camera 4, a CCD camera can be used, and as the image memory 3, a frame memory can be used.

The heater 9 heats a tubular heat-shrinkable resin disposed so as to cover the outer periphery in order to protect a fusion-spliced portion where the optical fibers F are fusion-spliced to each other, thereby fixing the fusion-spliced portion by the heat-shrinkable resin. The thermistor 10 measures a heating temperature of the heater 9 and adjusts the amount of electric power that the interface circuit with temperature control 5 supplies to the heater 9, based on the measured value. Further, the interface circuit with temperature control 5 is connected to the motor and sensor 6 and the discharge circuit 7, thereby enabling the control by the CPU 14.

Next, an operation of fusion-splicing the optical fibers F and an operation of reinforcing the fusion-spliced portion in the optical-fiber fusion-splicing device 11 according to this example will be described.

(Fusion-Splicing Operation)

The optical fibers F are displaced at the first heating device 12, and the end faces of the optical fibers F are brought into contact with each other. Then, a fusion start switch (not shown) of the optical-fiber fusion-splicing device 11 is pressed down. Then, power is supplied to the discharge electrodes 8 of the first heating device 12, whereby arc discharge is generated between the discharge electrodes 8 and the end faces of the optical fibers F are fusion-spliced to each other. A time of the fusion-splicing operation is in a range of 60 seconds to 90 seconds, for example, a discharge time between the discharge electrodes 8 during the fusion-splicing operation is, for example, about 7 seconds.

(Reinforcing Operation)

The fusion-spliced optical fiber F is removed from the first heating device 12, and the tubular heat-shrinkable resin mounted on the optical fiber F on one side in advance is moved, thereby being disposed so as to cover the fusion-spliced portion of the optical fiber F and a reinforcement material along the fusion-spliced portion. Then, the fusion-spliced portion of the optical fiber F covered with the heat-shrinkable resin is set to the second heating device 13, and a reinforcement start switch (not shown) is pressed down. Then, power is supplied to the heater 9 of the second heating device 13, whereby the temperature of the heater 9 rises to a predetermined heating temperature (for example, 230° C.) determined in advance. After the elapse of a predetermined reinforcement heating time (for example, 18 seconds) when the heat-shrinkable resin is sufficiently shrunk, the power supply to the heater 9 of the second heating device 13 is ended, whereby cooling is performed and the reinforcing operation is ended. Due to the reinforcing operation, the heat-shrinkable resin heat-shrinks, thereby coming into close contact with the outer peripheries of the fusion-spliced portion of the optical fiber F and the reinforcement material. In this way, the fusion-spliced portion of the optical fiber F, along which the reinforcement material is disposed, is covered with and reinforced by the heat-shrinkable resin.

Incidentally, in a case of continuously performing the splicing of the optical fibers F, there is a case where the operation of fusion-splicing the next optical fibers F is performed during the reinforcing operation. In this case, the CPU 14 preferentially supplies the power of the power supply unit 1, in which available power-supply capacity or the upper limit of power is determined, to the first heating device 12, thereby performing discharge-fusion, and interrupts heating in the heater 9 of the second heating device 13 during an electric discharge in the discharge electrodes 8.

Next, an example of the control of the second heating device 13 by the CPU 14 in a case where the electric discharge for the fusion-splicing operation is performed during the reinforcing operation will be described.

Figure 2:
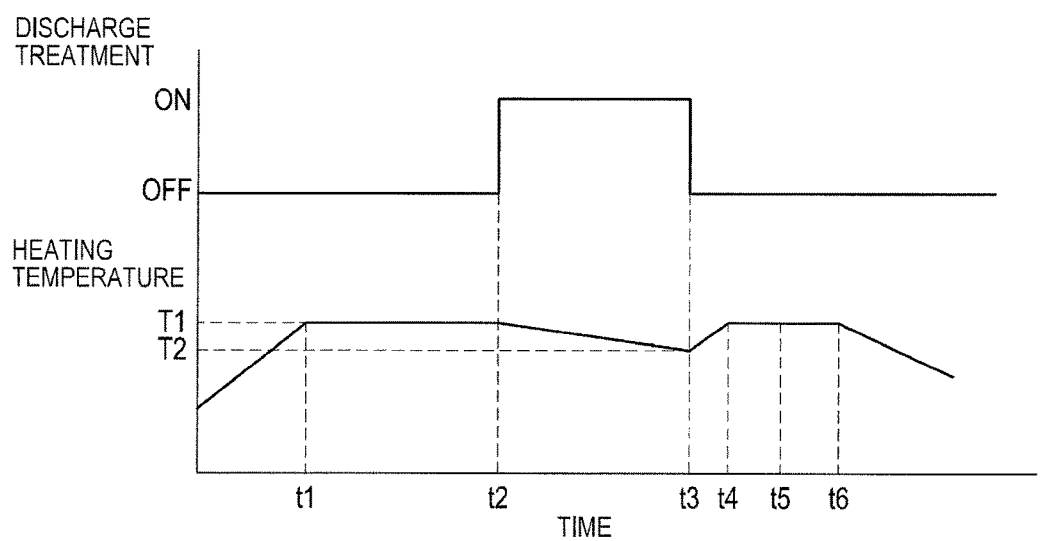
FIG. 2 is a graph showing a heating temperature characteristic in a second heating device of the optical-fiber fusion-splicing device according to the embodiment of the present invention.

FIG. 2 is a graph showing a heating temperature characteristic in the second heating device 13 of the optical-fiber fusion-splicing device 11 according to the embodiment of the present invention.

As shown in FIG. 2, the reinforcement start switch is pressed down, and thus power is supplied, whereby the heater 9 of the second heating device 13 rises in temperature, thereby reaching a predetermined heating temperature T1 (t1 in FIG. 2), and the predetermined heating temperature T1 is maintained.

If the fusion start switch is pressed down during heating at the predetermined heating temperature T1 and the fusion-splicing of the optical fibers F by arc discharge at the discharge electrodes 8 of the first heating device 12 is started (discharge treatment ON) (t2 in FIG. 2), the power supply to the heater 9 of the second heating device 13 is stopped and heating is interrupted.

Thereafter, if the fusion-splicing of the optical fibers F in the first heating device 12 is ended (discharge treatment OFF) (t3 in FIG. 2), power is supplied to the heater 9 of the second heating device 13 and heating is resumed. In this way, the heater 9 rises in temperature to the predetermined heating temperature T1 from a state where the temperature has been lowered to a temperature T2 in the heating interruption (t4 in FIG. 2), and maintains the predetermined heating temperature T1, and after the heat-shrink of the heat-shrinkable resin, the power supply to the heater 9 of the second heating device 13 is ended (t6 in FIG. 2).

Here, the heater 9 heated to the predetermined heating temperature T1, of the second heating device 13, maintains a high-temperature state without rapidly falling in temperature, even if power supply is stopped and thus heating is interrupted. For this reason, the heat-shrink of the heat-shrinkable resin progresses due to residual heat of the heater 9 during the heating interruption.

Figure 3:
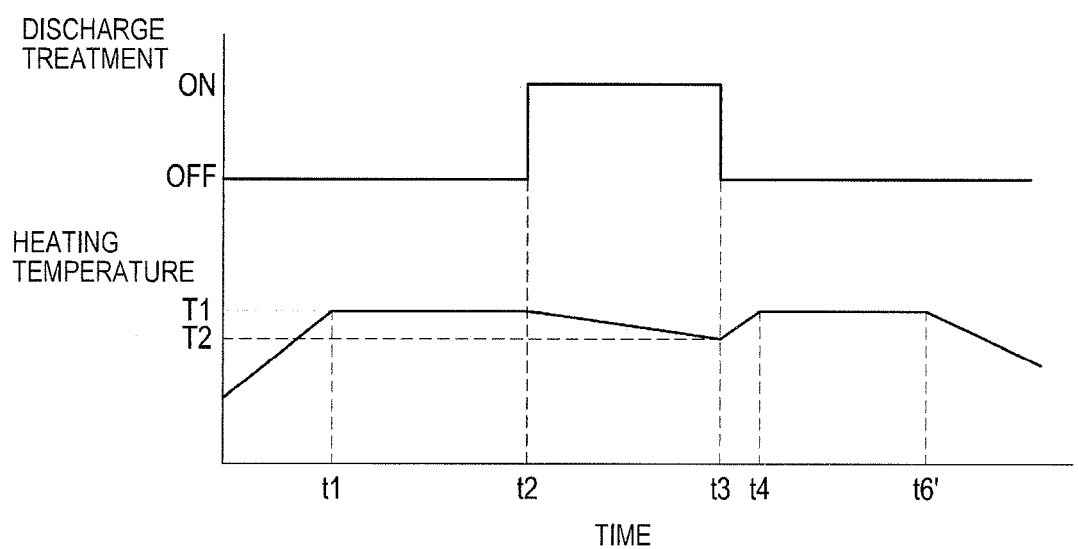
FIG. 3 is a graph showing a heating temperature characteristic in the second heating device describing the control according to a reference example.

FIG. 3 is a graph showing a heating temperature characteristic in the second heating device 13 describing the control according to a reference example.

As shown in FIG. 3, the control according to the reference example is to stop the counting of the reinforcement heating time which is a heating time of the heater 9 necessary for the heat-shrink of the heat-shrinkable resin, during a heating interruption time (t3-t2) when the heating of the heater 9 of the second heating device 13 is stopped. In the control according to the reference example, the heating interruption time (t3-t2) is directly set as an after-resumption heating time (t6'-t3) without taking into account the residual heat of the heater 9 in the heating interruption time (t3-t2). In other words, the after-resumption heating time (t6'-t3) is set such that the sum of a before-interruption heating time (t2-t1) before the heating interruption and the after-resumption heating time (t6'-t3) after the heating resumption becomes the reinforcement heating time becomes the reinforcement heating time.

In the control according to the reference example, the reinforcing operation time becomes longer by the heating interruption time (t3-t2) than in a case where the discharge-fusion is not performed during the reinforcing operation. Further, heating is performed such that the sum of the heating times except for the heating interruption time simply becomes the reinforcement heating time, and therefore, the heating amount of the heat-shrinkable resin is increased more than necessary due to the influence of the residual heat of the heater 9 during the heating interruption time, and thus the reliability of a reinforcement part is lowered.

In contrast, in the optical-fiber fusion-splicing device 11 according to this embodiment, even if the discharge-fusion is performed during the reinforcement operation, the CPU 14 continues to count the heating interruption time (t3-t2) as a part of the reinforcing heating time. Then, an after-resumption heating time (t6-t3) among the heating conditions after the heating resumption in the second heating device 13 is set based on the counted heating interruption time (t3-t2), in consideration of the residual heat of the heater 9 during the heating interruption.

Specifically, the after-resumption heating time (t6-t3) is set as follows. The remaining heating time (t5-t3) obtained by subtracting the before-interruption heating time (t2-t1) before the heating interruption and the heating interruption time (t3-t2) from the reinforcing heating time is determined. The total time obtained by adding an add time (t6-t5) obtained based on the heating interruption time (t3-t2) to the remaining heating time (t5-t3) is set as the after-resumption heating time (t6-t3).

The add time (t6-t5) is calculated by multiplying the heating interruption time (t3-t2) by a coefficient (for example, coefficient smaller than 1, such as 0.8) obtained in advance by an experiment or the like. The coefficient is set in consideration of the residual heat during the heating interruption. In addition, the add time (t6-t5) may be determined from a table which shows the relationship between the heating interruption time and the add time taking into account the residual heat and is determined in advance by an experiment, and the heating interruption time (t3-t2).

In this manner, in the optical-fiber fusion-splicing device 11 according to this embodiment, the heating condition after the resumption of heating in the second heating device 13 is set in consideration of the residual heat during the heating interruption, based on the heating interruption time in the second heating device 13 stopped due to heating of the first heating device 12. In this way, for example, the after-resumption heating time after the heating resumption is set to be a heating amount necessary for the shrinkage of the heat-shrinkable resin, whereby it is possible to prevent the reinforcing operation time from becoming unnecessarily long. Further, it is also possible to suppress unnecessary power consumption. Further, it is also possible to eliminate excessive heating of the heat-shrinkable resin, and thus it is possible to enhance the reliability of the reinforcement portion.

Further, in the optical-fiber fusion-splicing device 11 according to this embodiment, it is possible to suppress power consumption, and therefore, it is possible to increase the number of times of the fusion-splicing operation and the number of times of the reinforcing operation per one-time charge in a case where the optical-fiber fusion-splicing device is operated by a battery.

Further, as a way of setting the heating condition after the heating resumption in the second heating device 13, there is no limitation to the above-described example and for example, an after-resumption heating temperature after the heating resumption may be adjusted to a high temperature and then set to be a heating amount necessary for the shrinkage of the heat-shrinkable resin. Further, a configuration of resetting both the after-resumption heating time and the after-resumption heating temperature is also acceptable.

Further, in the above-described embodiment, the heating condition after the heating resumption is set based on the heating interruption time in the second heating device 13. However, the heating condition after the heating resumption may be set based on a change in temperature during the heating interruption in the second heating device 13, or both the heating interruption time and the change in temperature during the heating interruption in the second heating device 13.

Next, a case where the heating condition after the heating resumption in the second heating device 13 is set based on a change in temperature during the heating interruption in the second heating device 13 will be described.

The CPU 14 measures the temperature of the heater 9 during the heating interruption. Then, the after-resumption heating time (t6-t3) among the heating conditions after the heating resumption in the second heating device 13 is set based on a change in temperature (T1-T2) during the heating interruption in the second heating device 13, in consideration of the residual heat of the heater 9 during the heating interruption.

Specifically, the after-resumption heating time (t6-t3) is set as follows. The remaining heating time (t5-t3) obtained by subtracting the before-interruption heating time (t2-t1) before the heating interruption and the heating interruption time (t3-t2) from the reinforcing heating time is determined. The total time obtained by adding the add time (t6-t5) obtained from the change in temperature (T1-T2) during the heating interruption to the remaining heating time (t5-t3) is set as the after-resumption heating time (t6-t3).

The add time (t6-t5) is calculated by multiplying the change in temperature (T1-T2) during the heating interruption by a coefficient obtained in advance by an experiment or the like. The coefficient is set in consideration of the residual heat during the heating interruption. In addition, the add time (t6-t5) may be determined from a table which shows the relationship between the change in temperature during the heating interruption and the add time taking into account the residual heat and is determined in advance by an experiment, and the change in temperature (T1-T2).

In this manner, also in the case of the control in which the heating condition after the heating resumption in the second heating device 13 is set based on a change in temperature during the heating interruption in the second heating device 13, for example, the after-resumption heating time (t6-t3) after the heating resumption is set to be a heating amount necessary for the shrinkage of the heat-shrinkable resin, whereby the reinforcing operation time can be prevented from becoming unnecessarily long. Further, it is also possible to suppress unnecessary power consumption. Further, it is also possible to eliminate excessive heating of the heat-shrinkable resin, and thus it is possible to enhance the reliability of the reinforcement portion.

Also in the case of this control, as a way of setting the heating condition, for example, the after-resumption heating temperature after the heating resumption may be adjusted to a high temperature and then set to be a heating amount necessary for the shrinkage of the heat-shrinkable resin. Further, a configuration of resetting both the after-resumption heating time and the after-resumption heating temperature is also acceptable.

In addition, in the above-described embodiment, the optical-fiber fusion-splicing device 11 in which the second heating device 13 is provided with a single heater 9 has been described as an example. However, the second heating device 13 may have a central heater which heats the center in a longitudinal direction of the heat-shrinkable resin and heaters on both sides which heat both sides in the longitudinal direction of the heat-shrinkable resin, and independently control the heating of the central heater and the heating of the heaters on both sides. In the second heating device 13 having such a configuration, the heat-shrinkable resin is shrunk in sequence toward both end sides from the center side in the longitudinal direction by heating the central heater ahead of the heaters on both sides, whereby it is possible to bring the heat-shrinkable resin into close contact with the fusion-spliced portion of the optical fiber F without an air gap. Further, the present invention can also be applied to an optical-fiber fusion-splicing device provided with the second heating device 13 having heaters at the center and both sides.

Further, the residual heat of the heater 9 during the heating interruption varies according to a timing of the discharge treatment during the reinforcing operation. Therefore, the setting of the heating condition after the heating resumption in the second heating device 13 may take into account a start timing of the discharge treatment during the reinforcing operation. In this case, a heating amount necessary for the shrinkage of the heat-shrinkable resin after the heating resumption can be set with a higher degree of accuracy.

In addition, a specific discharge time in the first heating device 12 and a specific heating temperature and heating time in the second heating device 13 in the above-described embodiment are examples, and the discharge time in the first heating device 12 and the heating temperature and the heating time in the second heating device 13 are set according to various conditions.

The present invention has been described in detail with reference to a specific embodiment. However, it will be apparent to those skilled in the art that various changes or modifications can be made without departing from the spirit and the scope of the present invention.

This application is based on Japanese Patent Application No. 2014-013809 filed on Jan. 28, 2014, the content of which is incorporated herein by reference.

REFERENCE SIGNS LIST

11: optical-fiber fusion-splicing device
12: first heating device
13: second heating device
14: CPU (control unit)
F: optical fiber

The invention claimed is:

1. An optical-fiber fusion-splicing device comprising:
    a first heating device in which a fusion-splicing operation of heating and fusing abutting parts of at least a pair of optical fibers with end faces brought into contact with each other is performed;
    a second heating device in which a reinforcing operation of heating and shrinking a heat-shrinkable resin which covers a fusion-spliced portion is performed; and
    a control unit which controls the first heating device and the second heating device, and is programmed to:
    stop heating of the second heating device if heating of the first heating device is started during heating in the second heating device,
    resume heating of the second heating device if the heating of the first heating device is ended, and
    set a heating condition after resumption of heating in the second heating device, based on at least an interruption time of heating in the second heating device.

2. The optical-fiber fusion-splicing device according to claim 1, wherein the heating condition is based on residual heat of the second heating device during the heating interruption.

3. An optical-fiber fusion-splicing device comprising:
    a first heating device in which a fusion-splicing operation of heating and fusing abutting parts of at least a pair of optical fibers with end faces brought into contact with each other is performed;
    a second heating device in which a reinforcing operation of heating and shrinking a heat-shrinkable resin which covers a fusion-spliced portion is performed; and
    a control unit which controls the first heating device and the second heating device, and is programmed to:
    stop heating of the second heating device if heating of the first heating device is started during heating in the second heating device,
    resume heating of the second heating device if the heating of the first heating device is ended, and
    set a heating condition after resumption of heating in the second heating device, based on at least a change in temperature during heating interruption in the second heating device.

4. The optical-fiber fusion-splicing device according to claim 3, wherein the heating condition is based on residual heat of the second heating device during the heating interruption.

\* \* \* \* \*